(12) United States Patent
Kim et al.

(10) Patent No.: US 12,224,652 B2
(45) Date of Patent: Feb. 11, 2025

(54) MOTOR COOLING STRUCTURE (71) Applicants: HYUNDAI MOTOR COMPANY, Seoul (KR); KIA CORPORATION, Seoul (KR)

(72) Inventors: Shin Jong Kim, Hwaseong-si (KR); Byoung Hoon Choi, Seongnam-si (KR); Jong Hyun Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 798 days.

(21) Appl. No.: 17/383,124

(22) Filed: Jul. 22, 2021

(65) Prior Publication Data

US 2022/0109350 A1 Apr. 7, 2022

(30) Foreign Application Priority Data

Oct. 5, 2020 (KR) ........................ 10-2020-0127862

(51) Int. Cl.
*H02K 9/19* (2006.01)
*H02K 1/16* (2006.01)
*H02K 1/20* (2006.01)

(52) U.S. Cl.
CPC ................. *H02K 9/19* (2013.01); *H02K 1/20* (2013.01); *H02K 1/16* (2013.01)

(58) Field of Classification Search
CPC .. H02K 1/20; H02K 5/20; H02K 9/19; H02K 2209/00
USPC ............................................................ 310/54
See application file for complete search history.

(56) References Cited

U.S. PATENT DOCUMENTS

2019/0207457 A1* 7/2019 Hamiti .................. H02K 5/203
2021/0234423 A1* 7/2021 Leonardi ................ B60K 11/02

\* cited by examiner

*Primary Examiner* — Quyen P Leung
*Assistant Examiner* — Minki Chang
(74) *Attorney, Agent, or Firm* — MCDONNELL BOEHNEN HULBERT & BERGHOFF LLP (57) ABSTRACT

In a motor cooling structure including a rotor connected to a rotary shaft, a stator disposed on the rotor and including a stator core and coils, and a housing surrounding the rotor and the stator, the motor cooling structure includes: a first cover provided to extend along the inner circumferential surface of the coil between the stator core and the coils disposed on both sides of the stator core and a second cover disposed on the outsides of the coils with respect to the stator core and provided to extend along the inner circumferential surfaces of the coils, and the oil for cooling a motor through a chamber and a channel flows.

17 Claims, 11 Drawing Sheets

ENLARGED DIAGRAM OF PORTION A

MOTOR COOLING STRUCTURE

CROSS REFERENCE TO RELATED APPLICATIONS

This application claims under 35 U.S.C. § 119(a) the benefit of priority to Korean Patent Application No. 10-2020-0127862 filed on Oct. 5, 2020, the entire contents of which are incorporated herein by reference.

BACKGROUND

(a) Technical Field

The present disclosure relates to a motor cooling structure providing a cooling channel for cooling a motor through covers disposed to contact a stator and a coil.

(b) Background Art

An eco-friendly vehicle is provided with a motor configured to drive a vehicle with a power source of a high-voltage battery. The motor is composed of main components for generating an output such as a permanent magnet, a core, and a coil, and heat occurs in the motor by electric resistance and magnetic resistance occurring in the main components when a current or a magnetic force flows. Therefore, in the high-temperature condition having a predetermined temperature or more, the component performance may irreversibly deteriorate, and the deterioration may damage the component and lower the motor performance. Therefore, to maintain the motor performance, cooling should be provided for maintaining the motor temperature at a predetermined level.

Conventionally, to cool the motor, a method for installing a cooling pipe in a motor housing, and injecting the oil delivered through the cooling pipe to a stator is adopted. However, there are problems of increasing the weight of the cooling structure and the cost for implementing the cooling structure due to the configuration such as the cooling pipe and an injection nozzle for injecting the oil. Since the cooling structure includes the cooling pipe and the injection nozzle, the entire length of the motor is increased. Further, as the oil is injected only outside the stator, the core of the stator is not cooled.

The above information disclosed in this Background section is only for enhancement of understanding of the background of the disclosure and accordingly it may include information that does not form the prior art that is already known in this country to a person of ordinary skill in the art.

SUMMARY

An object of the present disclosure is to provide a motor cooling structure capable of deleting a cooling pipe and effectively cooling a stator using two types of covers.

Another object of the present disclosure is to provide a motor cooling structure, which may inject the oil toward the outside of a rotor while cooling a stator, thereby also cooling the rotor.

Provided is a motor cooling structure according to an exemplary embodiment of the present disclosure. In a motor cooling structure including a rotor connected to a rotary shaft, a stator disposed on the rotor and comprising a stator core and coils, and a housing surrounding the rotor and the stator, the motor cooling structure includes a first cover provided to extend along the inner circumferential surface of the coil between the stator core and the coils disposed on both sides of the stator core and a second cover disposed on the outsides of the coils with respect to the stator core and provided to extend along the inner circumferential surfaces of the coils, and the oil for cooling a motor through a chamber, which is the space between the stator core, the coils, and the housing, and a channel, which is the space between the stator core and the housing, flows.

According to an example, two first covers and two second covers are provided to both sides of the stator core, respectively, and at least one of the second covers is in contact with the housing to separate the chamber into a plurality of spaces.

According to the example, the chamber is divided into a first chamber, a second chamber, a third chamber, and a fourth chamber by the second covers, the oil introduced into the first chamber through a hole defined in each of the second covers is introduced into the second chamber, and the oil flows from the second chamber to the third chamber through the channel.

According to the example, the oil flowing from the third chamber to the fourth chamber is injected to the rotor through an additional hole defined in the second cover, and the additional hole is defined in the point extending along the inner circumferential surfaces of the coils.

According to the example, the first cover includes a first flange part, which is the plate provided between the stator core and the coils, and a first protrusion having the cylinder shape extending along the inner circumferential surfaces of the coils from the first flange part, the second cover includes a second flange part, which is the plate provided on the outsides of the coils, and a second protrusion having the cylinder shape extending along the inner circumferential surfaces of the coils from the second flange part, and a hollow through which the rotary shaft passes is defined in each of the first protrusion and the second protrusion.

According to the example, a step part having different height levels is defined on the edge of the second protrusion, the step part has a first surface and a second surface, and the first protrusion is in contact with the second surface having a smaller height level with respect to the second flange part.

According to the example, the second flange part extends to be in contact with the housing to divide a space between the second flange part and the housing and a space between the coil and the housing.

According to the example, the space between the housing and the coils is divided into a first chamber and a second chamber by the second flange part provided to one side of the stator core, the space between the housing and the coils is divided into a third chamber and a fourth chamber by the second flange part provided to the other side facing the one side of the stator core, and the second chamber and the third chamber adjacent to the stator core are connected through the channel and the oil introduced through the first chamber flows to the third chamber.

According to the example, an extension part extending from the second flange part provided to the one side of the stator core toward the housing is provided to the second cover, and the extension part is in contact with the housing to separate the space between the coil provided to the one side and the housing into the first chamber and the second chamber.

According to the example, an extension part extending from the second flange part provided to the other side of the stator core to the outer circumferential surfaces of the coils is provided to the second cover, and the extension part is in contact with the housing to separate the space between the coil provided to the other side and the housing into the third chamber and the fourth chamber.

According to the example, a gap exists between the second flange part and the coils, and a first hole for flowing the oil to the point at which the coils and the second flange part overlap in the direction in which the rotary shaft extends is defined in the second flange part.

According to the example, a second hole into which the oil is injected by the rotor is defined in the second protrusion, and the diameter of the second hole is smaller than the diameter of the first hole.

According to the example, the second protrusion includes a first region in which a step part is defined and a second region in which the second hole is defined, the step part is defined on the outer surface of the first region, and one end of the second region is connected to the inner surface of the first region, and an oil injection channel, which is the space into which the oil is introduced in the fourth channel, is defined between the first region and the second region.

According to the example, the second region includes a hole region in which the second hole is defined, and the hole region means a portion bent to have an acute angel with respect to the first region.

According to the example, the second region is provided in only some regions of the inner surface of the first region with respect to the center of the second protrusion, and the second hole into which the oil is injected toward the rotating rotor.

According to the example, slots, which are the spaces into which the coils are inserted, are defined in the first flange part, and a plurality of slots are defined clockwise with respect to the hollow of the first cover.

According to the example, the second cover is in contact with the housing, and a sealing member is provided between the second cover and the housing to seal the chamber.

According to the exemplary embodiment of the present disclosure, the oil introduced into the first chamber may flow to the second chamber through the channel. The stator core and the coils may be cooled in the flow process of the oil. The oil involved in the cooling of the stator core and the coils may not be introduced into the rotor. Therefore, it is possible to delete the cooling pipe for injecting the oil through two types of covers and to reduce the length of the motor by deleting the cooling pipe.

The exemplary embodiment of the present disclosure may flow the oil between the sealed chambers through the first holes formed in the second cover, thereby efficiently cooling up to the cores of the stator core and the coil.

The exemplary embodiment of the present disclosure may cool the stator core and the coils as the oil flows through the chambers, and further, cool the rotor as the oil within the first chamber and the fourth chamber is injected through the second holes.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The advantages and features of the present disclosure, and the method for achieving them may be clarified with reference to the exemplary embodiment to be described later together with the accompanying drawings. However, the present disclosure is not limited to the exemplary embodiment disclosed below but may be implemented in various different forms, and the present exemplary embodiment is merely provided to complete the disclosure of the present disclosure, and to fully notify those skilled in the art to which the present disclosure pertains of the scope of the disclosure, and the present disclosure is defined by only the scope of the claims. Throughout the specification, the same reference numerals indicate the same components.

Further, in the present specification, distinguishing the names of the components into a first, a second, and the like is to distinguish them because the names of the components are the same, and the names are not necessarily limited to the order thereof in the following description.

The detailed description merely exemplifies the present disclosure. Further, the aforementioned contents illustrate and describe the preferred exemplary embodiment of the present disclosure, and the present disclosure may be used in various combination, changes, and environments. That is, the present disclosure may be changed or modified within the range of the concept of the disclosure disclosed in the present specification, the range equivalent to the disclosed contents, and/or the range of the technology or knowledge in the art. The described exemplary embodiment describes the best mode for implementing the technical spirit of the present disclosure, and various changes required in the specific applications and uses of the present disclosure are also possible. Therefore, the detailed description of the disclosure is not intended to limit the present disclosure to the disclosed exemplary embodiment. Further, the appended claims should be interpreted as also including other exemplary embodiments.

Figure 1:
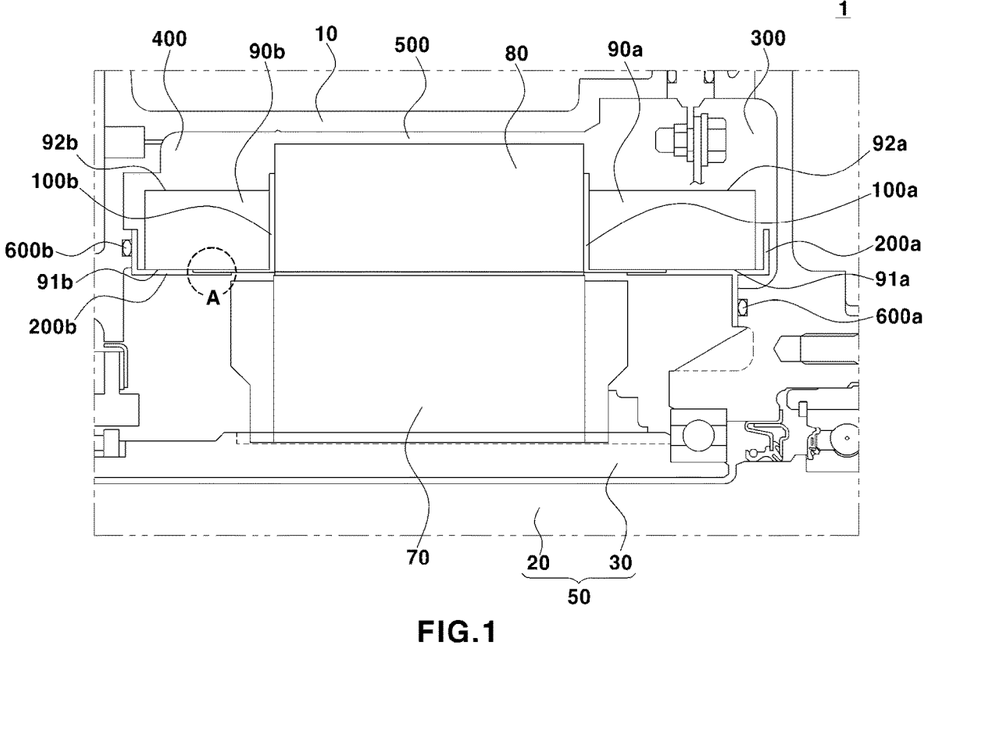
FIG. 1 is a diagram illustrating a motor cooling structure according to an exemplary embodiment of the present disclosure.

FIG. 1 is a diagram illustrating a motor cooling structure according to an exemplary embodiment of the present disclosure.

Referring to FIG. 1, a motor cooling structure 1 may include a rotor 70 connected to a rotary shaft 50, a stator disposed on the rotor 70 and including a stator core 80 and coils 90a, 90b, and a housing 10 surrounding the rotor 70 and the stator. The motor cooling structure 1 may adopt a method for cooling the stator core 80 and the coils 90a, 90b through chambers 300, 400 filled with the oil and a channel 500 within the housing 10, rather than a cooling method for injecting the oil into the stator. The rotary shaft 50 may be composed of a rotor shaft 30 connected to the rotor 70 and an inner shaft 20 which is the center axis of the motor.

A cooling pipe is required for the oil injection method, which is the conventional cooling method, but the motor cooling structure 1 according to the exemplary embodiment of the present disclosure may adopt two types of covers 100a, 100b, 200a, 200b for flowing the oil through the chamber 300, 400 and the channel 500.

First covers 100a, 100b may be disposed between the stator core 80 and the coils 90a, 90b disposed on both sides of the stator core 80. The first covers 100a, 100b may be disposed on both sides of the stator core 80, respectively. The first covers 100a, 100b may be provided to extend along the inner circumferential surfaces 91a, 91b of the coils 90a, 90b between the stator core 80 and the coils 90a, 90b. The inner circumferential surfaces 91a, 91b of the coils 90a, 90b may mean the surfaces facing the rotary shaft 50. The outer circumferential surfaces 91a, 91b of the coils 90a, 90b may mean the surfaces facing the housing 10. A plurality of coils 90a, 90b may be provided clockwise with respect to the rotary shaft 50, and divided into the coil 90a disposed on one side of the stator core 80 and the coil 90b disposed on the other side of the stator core 80. One side of the stator core 80 and the other side of the stator core 80 may face each other. The first covers 100a, 100b may include the first cover 100a contacting the coil 90a disposed on one side of the stator core 80 and the first cover 100b contacting the coil 90b disposed on the other side of the stator core 80. The first cover 100a may be disposed to contact one side of the stator core 80, and the first cover 100b may be disposed to contact the other side of the stator core 80.

Second covers 200a, 200b may be disposed on the outsides of the coils 90a, 90b with respect to the stator core 80 and provided to extend along the inner circumferential surfaces 91a, 91b of the coils 90a, 90b. The second covers 200a, 200b may be disposed on both sides of the stator core 80, respectively. The second covers 200a, 200b may be in contact with the housing 10, and sealing members 600a, 600b may be provided between the second covers 200a, 200b and the housing 10. The sealing members 600a, 600b may seal between the second covers 200a, 200b and the housing 10, such that the chambers 300, 400 and the channel 500 may be sealed, thereby forming the path through which the oil flows.

A space between the coil 90a disposed on one side of the stator core 80 and the housing 10 may be defined as a first chamber 300. The first chamber 300 may be sealed by the second cover 200a and the sealing member 600a, and the oil introduced into the first chamber 300 may flow toward the channel 500. A space between the coil 90b disposed on the other side of the stator core 80 and the housing 10 may be defined as a second chamber 400. The second chamber 400 may be sealed by the second cover 200b and the sealing member 600b, and the oil may be introduced into the second chamber 400 through the channel 500. That is, the oil introduced through the first chamber 300 may flow to the second chamber 400 through the channel 500, and the second covers 200a, 200b may seal a part of the housing 10 such that the first chamber 300 and the second chamber 400 may communicate with each other through only the channel 500. The oil within the second chamber 400 may be discharged to a reducer (not illustrated) through an oil discharging part (not illustrated) formed in the housing 10.

According to the exemplary embodiment of the present disclosure, the oil introduced into the first chamber 300 may flow to the second chamber 400 through the channel 500. The stator core 80 and the coils 90a, 90b may be cooled in the flow process of the oil. The oil involved in the cooling of the stator core 80 and the coils 90a, 90b may not be introduced into the rotor 70. Therefore, it is possible to delete the cooling pipe for injecting the oil through two kinds of covers 100a, 100b, 200a, 200b and to reduce the length of the motor by deleting the cooling pipe.

Figure 2:
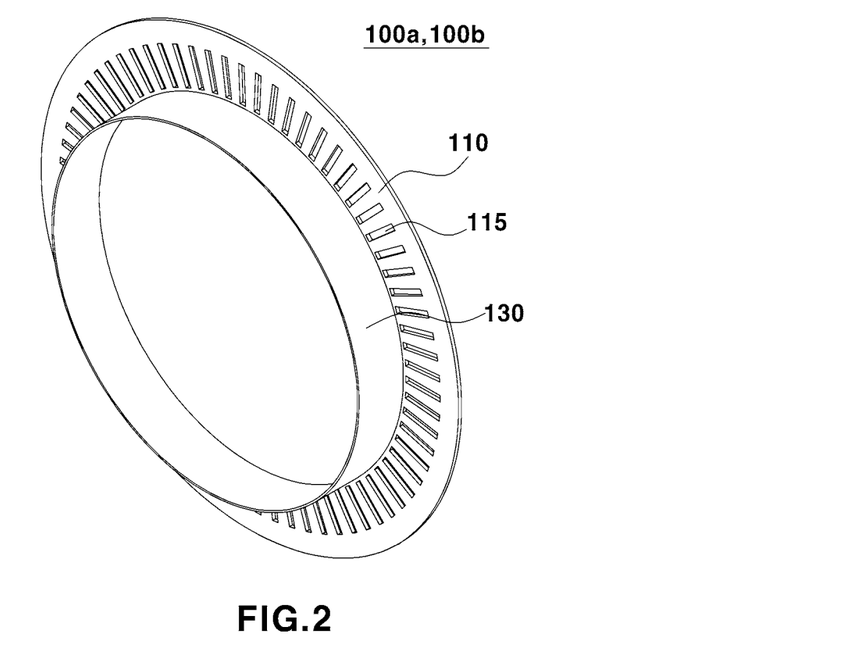
FIG. 2 is a diagram illustrating a first cover illustrated in FIG. 1.

FIG. 2 is a diagram illustrating the first cover illustrated in FIG. 1.

Referring to FIGS. 1 and 2, the first covers 100a, 100b are components disposed on one side and the other side of the stator core 80, respectively, and may have the same shapes as each other.

The first covers 100a, 100b may include a first flange part 110, which is the plate provided between the stator core 80 and the coils 90a, 90b, and a first protrusion 130 having a cylinder shape extending along the inner circumferential surfaces 91a, 91b of the coils 90a, 90b from the first flange part 110. The first flange part 110 may have the disc shape having a hollow, and the first protrusion 130 may have the cylinder shape having a hollow. That is, the first protrusion 130 may have the shape extending vertically from the upper surface of the first flange part 110. Slots 115, which are the spaces into which the coils 90a, 90b are inserted, may be defined in the first flange part 110. A plurality of slots 115 may be defined clockwise with respect to the hollows of the first covers 100a, 100b. The first covers 100a, 100b may be coupled to the coils 90a, 90b when the motor is assembled, thereby preventing the oil introduced into the chambers 300, 400 from being leaked.

Figure 3:
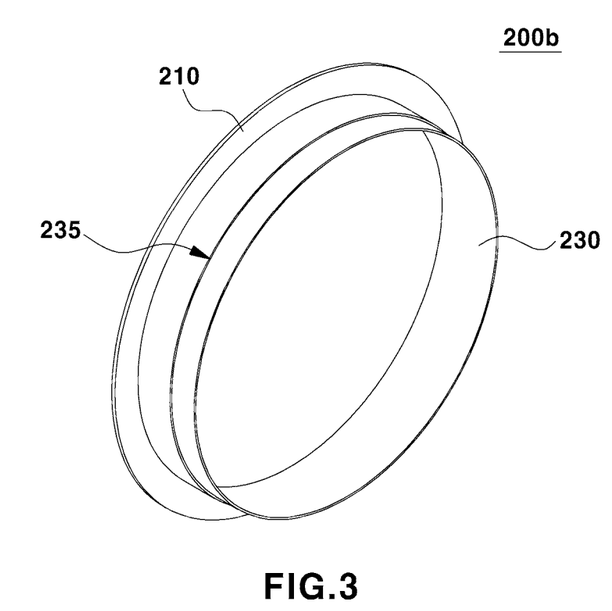
FIG. 3 is a diagram illustrating a second cover illustrated in FIG. 1.

FIG. 3 is a diagram illustrating the second cover of FIG. 1. FIG. 3 is a diagram illustrating the second cover 200b disposed on the other side of the stator core 80.

Referring to FIGS. 1 and 3, the second cover 200b may include a second flange part 210, which is the plate provided to the outside of the coil 90b, and a second protrusion 230 having the cylinder shape extending along the inner circumferential surface 91b of the coil 90b from the second flange part 210. The second flange part 210 may have the disc shape having a hollow, and the second protrusion 230 may have the cylinder shape having a hollow. That is, the second protrusion 230 may have the shape extending vertically from the upper surface of the second flange part 210.

A gap may exist between the second flange part 210 and the coil 90b. The second flange part 210 may be in contact with the housing 10, and the sealing member 600b may be provided between the second flange part 210 and the housing 10.

The second cover 200a disposed on one side of the stator core 80 may also have shape similar to the second cover 200b disposed on the other side of the stator core 80. The second cover 200a disposed on one side of the stator core 80 may also be in contact with the housing 10, and the sealing member 600a may be provided between the second cover 200a and the housing 10.

Figure 4:
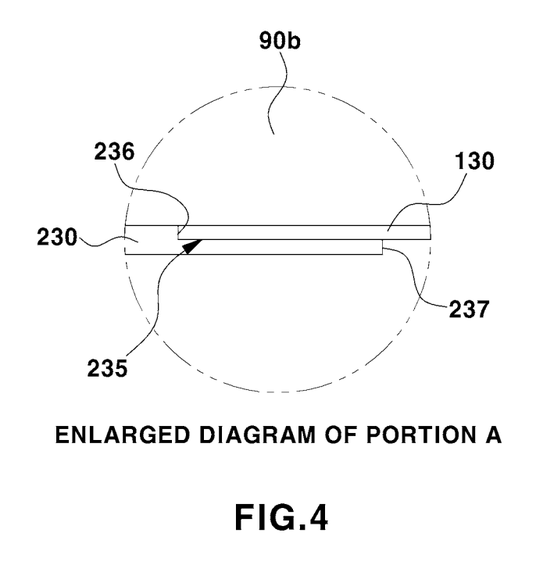
FIG. 4 is a diagram enlarging a region A illustrated in FIG. 1.

FIG. 4 is a diagram in which a region A illustrated in FIG. 1 is enlarged.

Referring to FIGS. 1 to 4, the first cover 100b and the second cover 200b may be in contact with each other on the inner circumferential surface 91b of the coil 90b. Specifically, the first protrusion 130 of the first cover 100b may be in contact with the second protrusion 230 of the second cover 200b. The first protrusion 130 may extend toward the second cover 200b along the inner circumferential surface 91b of the coil 90b, and the second protrusion 230 may extend toward the first cover 100b along the inner circumferential surface 91b of the coil 90b. The width of the first protrusion 130 may be smaller than the width of the second protrusion 230.

A step part 235 having different height levels may be defined on the edge of the second protrusion 230. The step part 235 may have a first surface 237 and a second surface 236 having different height levels. The height level of the first surface 237 may be higher than that of the second surface 236 with respect to the second flange part 110. The first protrusion 130 may be in contact with the second surface 236 having a lower height level with respect to the second flange part 110.

Figure 5:
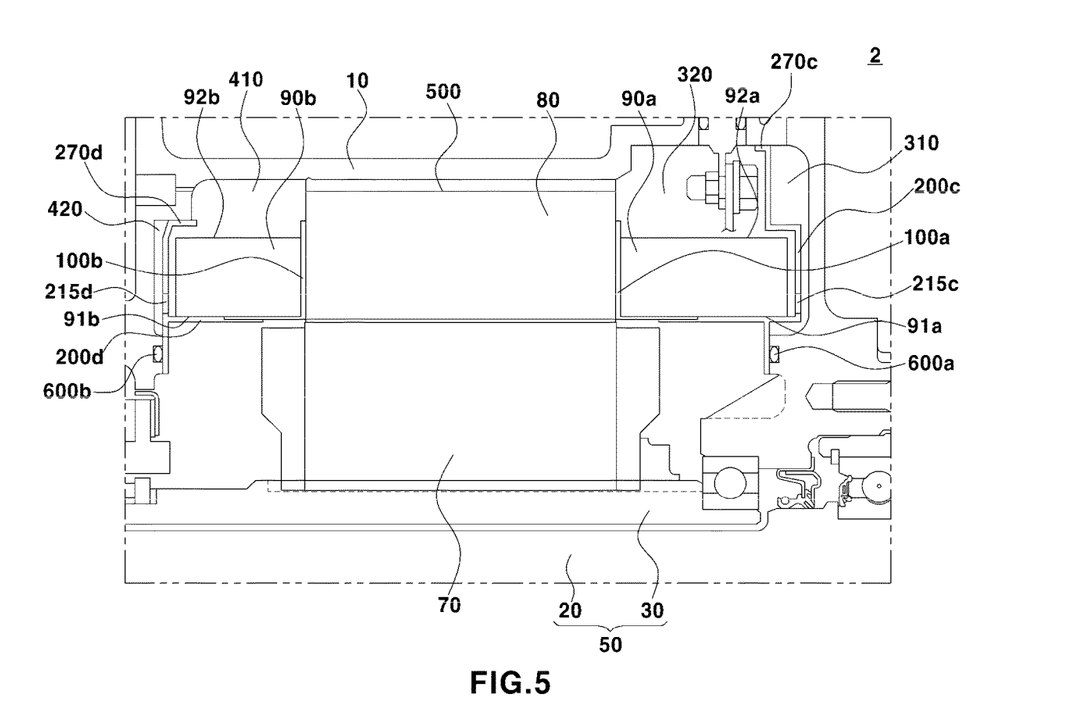
FIG. 5 is a diagram illustrating a motor cooling structure according to another exemplary embodiment of the present disclosure.
Figure 6:
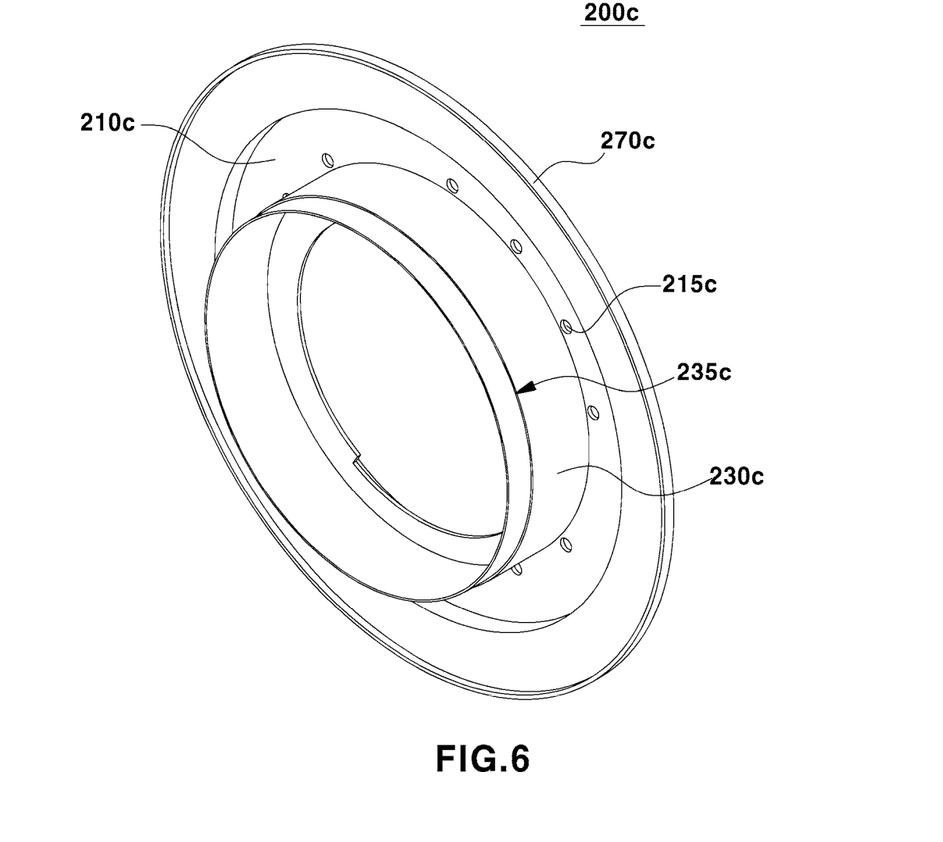
FIG. 6 is a diagram illustrating an example of the second cover illustrated in FIG. 5.
Figure 7:
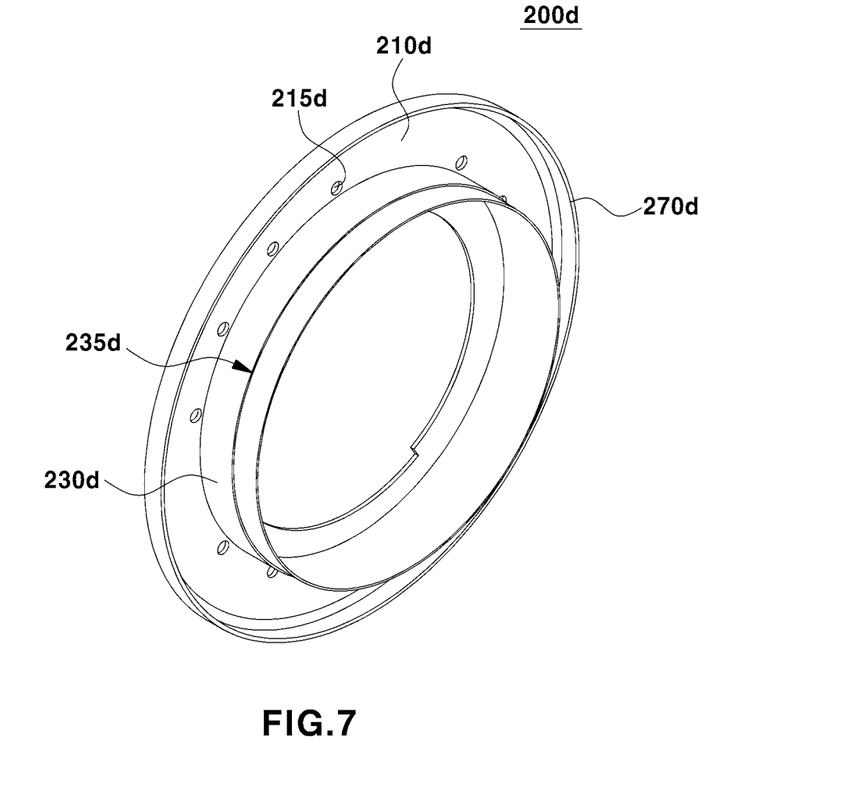
FIG. 7 is a diagram illustrating another example of the second cover illustrated in FIG. 5.

FIG. 5 is a diagram illustrating a motor cooling structure according to another exemplary embodiment of the present disclosure, FIG. 6 is a diagram illustrating an example of the second cover illustrated in FIG. 5, and FIG. 7 is a diagram illustrating another example of the second cover illustrated in FIG. 5. The description of the overlapping contents will be omitted for simplifying the explanation.

Referring to FIGS. 5 to 7, a motor cooling structure 2 may include the first covers 100a, 100b disposed between the stator core 80 and the coils 90a, 90b, and the second covers 200a, 200b disposed on the outsides of the coils 90a, 90b. The first covers 100a, 100b may have the same shapes as those of the first covers 100a, 100b illustrated in FIG. 1. However, the second covers 200c, 200d may have the shapes different from those of the second covers 200a, 200b illustrated in FIG. 1. Two first covers 100a, 100b and two second covers 200c, 200d may be provided to both sides of the stator core 80, respectively, and at least one of the second covers 200c, 200d may be in contact with the housing 10 to separate chambers 310, 320, 410, 420 into a plurality of spaces.

The second covers 200c, 200d may include the second cover 200c disposed on one side of the stator core 80 and the second cover 200d disposed on the other side of the stator core 80.

The second cover 200c disposed on one side of the stator core 80 may include a second flange part 210c, a second protrusion 230c, and an extension part 270c. The second flange part 210c may be disposed between the stator core 80 and the coil 90a, and the second protrusion 230c may have the cylinder shape extending along the inner circumferential surface 91a of the coil 90a from the second flange part 210a. The extension part 270c has the configuration extending from the second flange part 210c toward the housing 10, and may be bent. The extension part 270c may be in contact with the housing 10 to separate the space between the coil 90a provided to one side of the stator core 80 and the housing 10 into a first chamber 310 and a second chamber 320. First holes 215c may be defined in the second flange part 210c, and the oil within the first chamber 310 may flow to the second chamber 320 through the first holes 215c. A plurality of first holes 215c may be provided clockwise with respect to the center of the second cover 200c. The oil introduced into the second chamber 320 may cool the stator core 80 and the coil 90a. A step part 235c may be formed on the outer surface of the second protrusion 230c. The step part 235c may be in contact with the first protrusion (130 in FIG. 2) of the first cover 100a.

The second cover 200d disposed on the other side of the stator core 80 may include the second flange part 210d, the second protrusion 230d, and the extension part 270d. The second flange part 210d may be disposed between the stator core 80 and the coil 90b, and the second protrusion 230d may have the cylinder shape extending along the inner circumferential surface 91b of the coil 90b from the second flange part 210d. The extension part 270d may extend from the second flange part 210d to an outer circumferential surface 92b of the coil 90b. The extension part 270d may be in contact with the housing 10 to separate the space between the coil 90b provided to the other side of the stator core 80 and the housing 10 into the third chamber 410 and the fourth chamber 420. First holes 215d may be defined in the second flange part 210d, and the oil within the third chamber 410 may flow to the fourth chamber 420 through the first holes 215d. A plurality of first holes 215d may be provided clockwise with respect to the center of the second cover 200d. The oil introduced from the second chamber 320 into the third chamber 410 through the channel 500 may cool the stator core 80 and the coil 90b. A step part 235d may be formed on the outer surface of the second protrusion 230d. The step part 235d may be in contact with the first protrusion (130 in FIG. 2) of the first cover 100b.

According to the exemplary embodiment of the present disclosure, the oil may flow between the sealed chambers 310, 320, 410, 420 through the first holes 215c, 215d formed in the second covers 200c, 200d. Specifically, the oil within the sealed first chamber 310 may flow to the second chamber 320 through the first holes 215c, and the oil within the third chamber 410 may flow to the fourth chamber 420 through the first holes 215d. That is, as the oil flows within the chambers 310, 320, 410, 420 through the first holes 215c and the first holes 215d, up to the cores of the stator core 80 and the coils 90a, 90b may be efficiently cooled.

Figure 8:
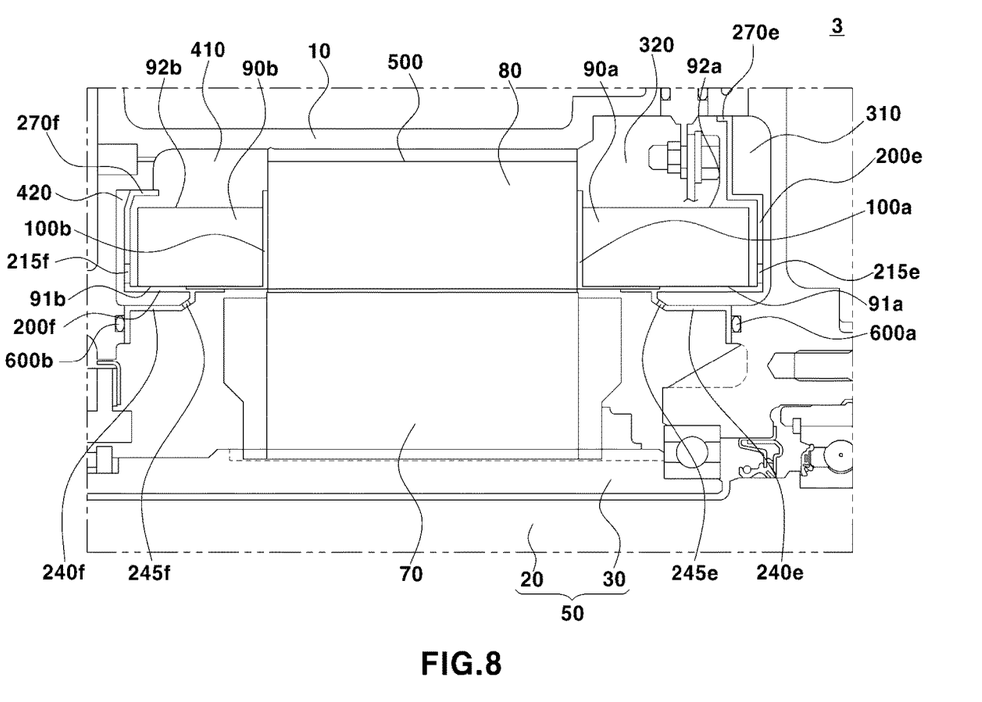
FIG. 8 is a diagram illustrating a motor cooling structure according to still another exemplary embodiment of the present disclosure.
Figure 9:
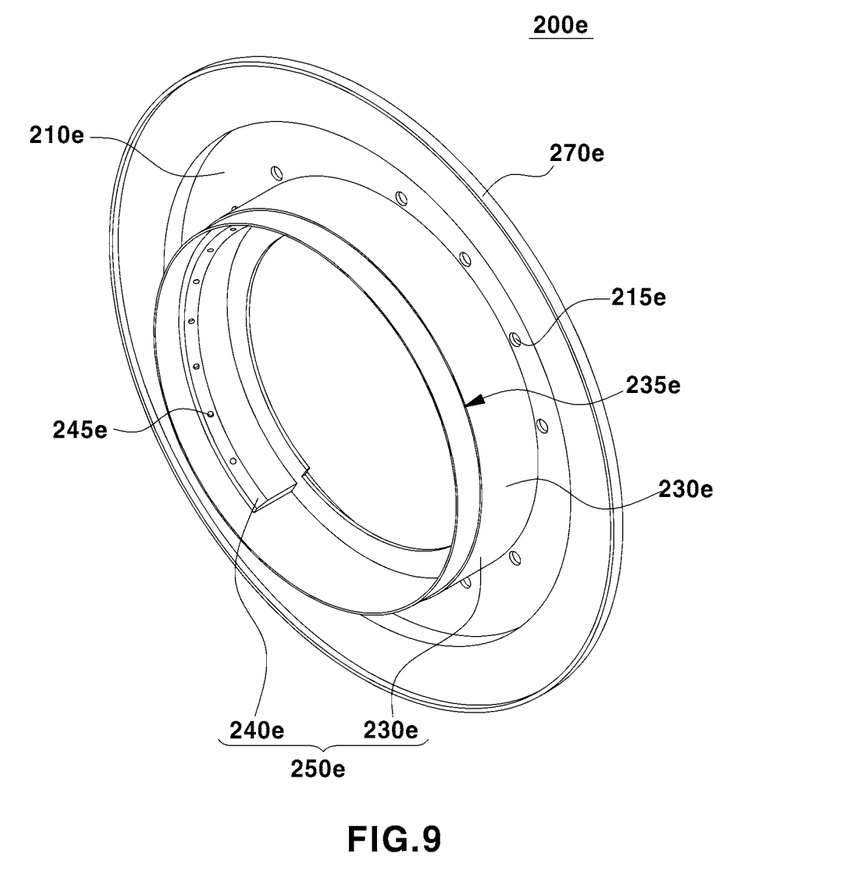
FIG. 9 is a diagram illustrating an example of a second cover illustrated in FIG. 8.
Figure 10:
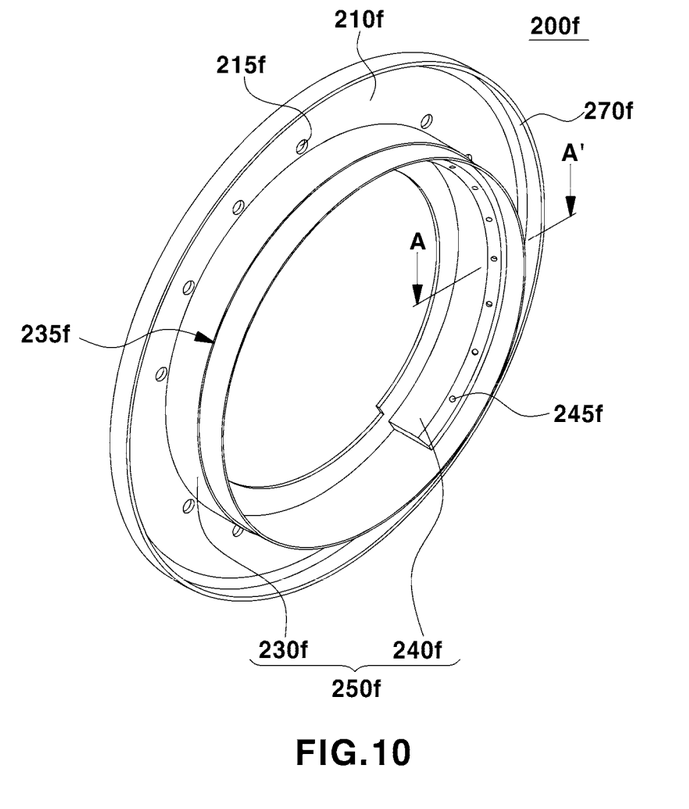
FIG. 10 is a diagram illustrating another example of the second cover illustrated in FIG. 8.

FIG. 8 is a diagram illustrating a motor cooling structure according to still another exemplary embodiment of the present disclosure, FIG. 9 is a diagram illustrating an example of the second cover illustrated in FIG. 8, and FIG. 10 is a diagram illustrating another example of the second cover illustrated in FIG. 8. The description of the overlapping contents will be omitted for simplifying the explanation.

Referring to FIGS. 8 to 10, a motor cooling structure 3 may include the first covers 100a, 100b disposed between the stator core 80 and the coils 90a, 90b and the second covers 200e, 200f disposed on the outsides of the coils 90a, 90b. The first covers 100a, 100b may have the same shapes as those of the first covers 100a, 100b illustrated in FIGS. 1 and 5. Two first covers 100a, 100b and two second covers 200e, 200f may be provided to both sides of the stator core 80, respectively, and at least one of the second covers 200e, 200f may be in contact with the housing 10 to separate the chambers 310, 320, 410, 420 into a plurality of spaces. Additional holes (second holes 245e, 245f to be described later) other than the first holes 215e, 215f may be defined in the second covers 200e, 200f, and the oil for cooling the rotor 70 may be injected into the additional holes (the second holes 245e, 245f to be described later) defined in the points extending along the inner circumferential surfaces 91a, 91b of the coils 90a, 90b.

The second covers 200e, 200f may include the second cover 200e disposed on one side of the stator core 80 and the second cover 200f disposed on the other side of the stator core 80.

The second cover 200e disposed on one side of the stator core 80 may include the second flange part 210e, the second protrusion 230e, and the extension part 270e. The second flange part 210e may be disposed between the stator core 80 and the coil 90a, and the second protrusion 230e may have the shape extending along the inner circumferential surface 91a of the coil 90a from the second flange part 210e. The extension part 270e has the configuration extending from the second flange part 210e toward the housing 10, and may be bent. The extension part 270e may be in contact with the housing 10 to separate the space between the coil 90a provided to one side of the stator core 80 and the housing 10 into the first chamber 310 and the second chamber 320. The first holes 215e may be defined in the second flange part 210a, and the oil within the first chamber 310 may flow to the second chamber 320 through the first holes 215e. A plurality of first holes 215e may be provided clockwise with respect to the center of the second cover 200e. The oil introduced into the second chamber 320 may cool the stator core 80 and the coil 90a. The step part 235e may be formed on the outer surface of the second protrusion 230e. The step part 235e may be in contact with the first protrusion (130 in FIG. 2) of the first cover 100a.

The second protrusion 250e may include a first region 230e and a second region 240e. The first region 230e may have the same shape as that of the second protrusion 250e illustrated in FIG. 6. The step part 235e may be defined on the outer surface of the first region 230e. One end of the second region 240e may be connected to the inner surface of the first region 230e. However, the second region 240e may be provided in only some regions of the inner surface of the first region 230e. For example, the second region 240e may be provided in only the region less than 180 degrees of the inner surface of the first region 230e with respect to the center of the second protrusion 250e. Since the second holes 245e defined in the second region 240e has the configuration for cooling the rotor 70, it may be unnecessary to provide the second region 240e in all regions of the inner surface of the first region 230e for injecting the oil toward the rotating rotor 70. Further, the second region 240e may be disposed on the upper portion of the housing 10 with respect to the rotary shaft 50. The second holes 245e for injecting the oil to the rotor 70 may be defined in the second region 240e. The oil introduced into the fourth chamber 420 may be injected toward the rotor 70 through the second holes 245e. The diameter of the second hole 245e may be smaller than the diameter of the first hole 215e.

The second cover 200f disposed on the other side of the stator core 80 may include the second flange part 210f, the second protrusion 230f, and the extension part 270f. The second flange part 210f may be disposed between the stator core 80 and the coil 90b, and the second protrusion 230f may have the shape extending along the inner circumferential surface 91b of the coil 90b from the second flange part 210f. The extension part 270f may extend from the second flange part 210f to the outer circumferential surface 92b of the coil 90b. The extension part 270f may be in contact with the housing 10 to separate the space between the coil 90b provided to the other side of the stator core 80 and the housing 10 into the first chamber 310 and the second chamber 320. The first holes 215f may be defined in the second flange part 210f, and the oil within the first chamber 310 may flow to the second chamber 320 through the first holes 215f. A plurality of first holes 215f may be provided clockwise with respect to the center of the second cover 200f. The oil introduced into the second chamber 320 may cool the stator core 80 and the coil 90b. The step part 235f may be formed on the outer surface of the second protrusion 230f. The step part 235f may be in contact with the first protrusion (130 in FIG. 2) of the first cover 100b.

The second protrusion 250f may include the first region 230f and the second region 240f. The first region 230f may have the same shape as that of the second protrusion 250f illustrated in FIG. 6. The step part 235f may be defined on the outer surface of the first region 230f. One end of the second region 240f may be connected to the inner surface of the first region 230f. However, the second region 240f may be provided in only some regions of the inner surface of the first region 230f. For example, the second region 240f may be provided in only the region less than 180 degrees of the inner surface of the first region 230f with respect to the center of the second protrusion 250f. Since the second holes 245f defined in the second region 240f has the configuration for cooling the rotor 70, it may be unnecessary to provide the second region 240f in all regions of the inner surface of the first region 230f for injecting the oil toward the rotating rotor 70. The second holes 245f for injecting the oil to the rotor 70 may be defined in the second region 240f. The oil introduced into the first chamber 310 may be injected toward the rotor 70 through the second holes 245f. The diameter of the second hole 245f may be smaller than the diameter of the first hole 215f.

According to the exemplary embodiment of the present disclosure, as the oil is injected through the second holes 245e, 245f formed in the second covers 200e, 200f, the rotor 70 may also be cooled. That is, as the oil flows through the chambers 310, 320, 410, 420, the stator core 80 and the coils 90a, 90b may be cooled, and additionally, as the oil within the first chamber 310 and the fourth chamber 420 is injected through the second holes 245e, 245f, the rotor 70 may also be cooled.

Figure 11:
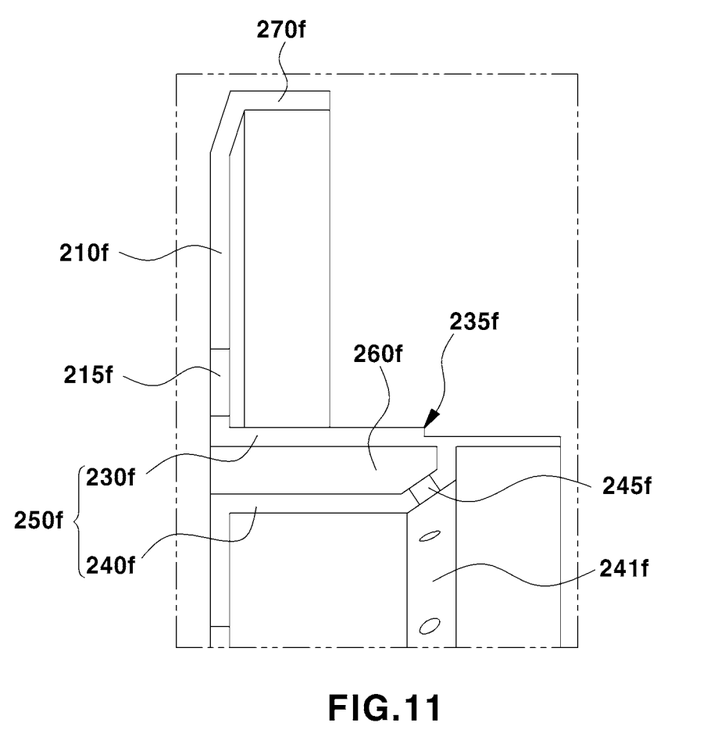
FIG. 11 is a cross-sectional diagram in which a part of FIG. 9 is cut.

FIG. 11 is a cross-sectional diagram in which a part of FIG. 9 is cut. The description of the overlapping contents will be omitted for simplifying the explanation.

Referring to FIGS. 8, 9, and 11, the second protrusion 250f may include the first region 230f and the second region 240f. The step part 235f may be defined on the outer surface of the first region 230f. One end of the second region 240f may be connected to the inner surface of the first region 230f. An oil injection channel 260f, which is the space into which the oil is introduced in the fourth channel 420, may be defined between the first region 230f and the second region 240f. The oil may flow from the third channel 410 to the fourth channel 420 through the first hole 215e, and the oil introduced to the fourth channel 420 may be introduced into the oil injection channel 260f.

The second hole 245f for injecting the oil into the rotor 70 may be defined in the second region 240f. That is, the second region 240f may include a hole region 241e in which the second hole 245f is defined. The hole region 241e may mean the bent portion with respect to the entire second region 240b. The surface of the hole region 241e may have an acute angle with the inner surface of the first region 230f. For example, the surface of the hole region 241e may be perpendicular to the direction facing the rotor 70 (targeting direction).

In addition to the aforementioned example, the oil injection channel 260f may also be provided to the second cover 200a disposed on one side of the stator core 80.

The exemplary embodiment of the present disclosure may reduce the distance between the second holes 245f through the oil injection channel 260f and the rotor 70. As a result, it is possible to effectively cool the outside of the rotor 70.

As described above, while the exemplary embodiments of the present disclosure have been described with reference to the accompanying drawings, those skilled in the art to which the present disclosure pertains will understand that the present disclosure may be implemented in various specific forms without changing the technical spirit or the essential feature. Therefore, it should be understood that the aforementioned exemplary embodiments are illustrative and not limitative in all respects.

The invention claimed is:

1. A motor cooling structure comprising a rotor connected to a rotary shaft, a stator disposed on the rotor and comprising a stator core and coils, and a housing surrounding the rotor and the stator,
wherein the motor cooling structure comprises:
a first cover extending along an inner circumferential surface of the coils between the stator core and the coils, the first cover being disposed on both sides of the stator core; and
at least one second cover disposed on the outside of the coils with respect to the stator core and provided to extend along the inner circumferential surfaces of the coils; and
wherein oil for cooling a motor through a chamber located between the stator core, the coils, and the housing, and a channel, located between the stator core and the housing, flows;
wherein the at least one second cover is in contact with the housing to separate the chamber into a plurality of spaces; and
wherein the oil flows between the plurality of spaces in the chamber through a first hole defined in each of the first cover and the at least one second cover, and wherein the oil is injected to the rotor through a second hole defined in the at least one second cover.

2. The motor cooling structure of claim 1, wherein two first covers and two second covers are provided on both sides of the stator core, respectively.

3. The motor cooling structure of claim 2,
wherein the chamber is divided into a first chamber, a second chamber, a third chamber, and a fourth chamber by the two second covers,
wherein the oil introduced into the first chamber through the first hole is introduced into the second chamber, and wherein the oil flows from the second chamber to the third chamber through the channel.

4. The motor cooling structure of claim 3,
wherein the oil flowing from the third chamber to the fourth chamber is injected to the rotor through the second hole, and wherein the second hole is defined in a point extending along the inner circumferential surfaces of the coils.

5. The motor cooling structure of claim 1,
wherein the first cover comprises: a first flange part comprising a plate provided between the stator core and the coils, and a first protrusion having a cylinder shape extending along the inner circumferential surfaces of the coils from the first flange part,
wherein the at least one second cover comprises: a second flange part, comprising a plate provided on the outsides of the coils, and a second protrusion having a cylinder shape extending along the inner circumferential surfaces of the coils from the second flange part, and
wherein a hollow through which the rotary shaft passes is defined in each of the first protrusion and the second protrusion.

6. The motor cooling structure of claim 5,
wherein a step part having different height levels is defined on the edge of the second protrusion,
wherein the step part has a first surface and a second surface, and
wherein the first protrusion is in contact with the second surface having a smaller height with respect to the second flange part.

7. The motor cooling structure of claim 5, wherein the at least one second cover extends to contact the housing to divide a space between the coil and the housing.

8. The motor cooling structure of claim 7,
wherein the space between the housing and the coils is divided into a first chamber and a second chamber by the second flange part provided to one side of the stator core,
wherein the space between the housing and the coils is divided into a third chamber and a fourth chamber by the second flange part provided to the other side facing the one side of the stator core, and
wherein the second chamber and the third chamber adjacent to the stator core are connected through the channel and the oil introduced through the first chamber flows to the third chamber.

9. The motor cooling structure of claim 8,
wherein an extension part extending from the second flange part provided to the one side of the stator core toward the housing is provided to one of the two second covers, and
wherein the extension part is in contact with the housing to separate the space between the coil provided to the one side and the housing into the first chamber and the second chamber.

10. The motor cooling structure of claim 8,
wherein an extension part extending from the second flange part provided to the other side of the stator core to the outer circumferential surfaces of the coils is provided to one of the two second covers, and
wherein the extension part is in contact with the housing to separate the space between the coil provided to the other side and the housing into the third chamber and the fourth chamber.

11. The motor cooling structure of claim 5,
wherein a gap exists between the second flange part and the coils, and
wherein the first hole for flowing the oil to a point at which the coils and the second flange part overlap in the direction in which the rotary shaft extends is defined in the second flange part.

12. The motor cooling structure of claim 11,
wherein the second hole into which the oil is injected to the rotor is defined in the second protrusion, and
wherein the diameter of the second hole is smaller than the diameter of the first hole.

13. The motor cooling structure of claim 12,
wherein the second protrusion comprises: a first region in which a step part is defined and a second region in which the second hole is defined,
wherein the step part is defined on the outer surface of the first region, and one end of the second region is connected to the inner surface of the first region, and
wherein an oil injection channel, which is the space into which the oil is introduced in the fourth channel, is defined between the first region and the second region.

14. The motor cooling structure of claim 13,
wherein the second region comprises: a hole region in which the second hole is defined, and
wherein the hole region comprises a portion bent to have an acute angel with respect to the first region.

15. The motor cooling structure of claim 13, wherein the second region is provided in only some regions of the inner surface of the first region with respect to the center of the second protrusion, and wherein the oil is injected toward the rotating rotor through the second hole.

16. The motor cooling structure of claim 5, wherein slots, which are the spaces into which the coils are inserted, are defined in the first flange part, and wherein the slots are defined clockwise with respect to the hollow of the first cover.

17. The motor cooling structure of claim 1, wherein the at least one second cover is in contact with the housing, and wherein a sealing member is provided between the at least one second cover and the housing to seal the chamber.

* * * * *